(12) United States Patent
Casellas et al.

(10) Patent No.: US 10,294,931 B2
(45) Date of Patent: May 21, 2019

(54) CONNECTING ROD-PISTON ASSEMBLY COMPRISING A CONNECTING ROD HAVING A SPHERICAL SMALL END

(71) Applicant: GKN Sinter Metals Engineering GmbH, Radevormwald (DE)

(72) Inventors: Antonio Casellas, Siegburg (DE); Matthias Innerbichler, Ahrntal-Südtirol (IT); Norbert Innerhofer, Gais-Südtirol (IT)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 218 days.

(21) Appl. No.: 15/112,604

(22) PCT Filed: Feb. 3, 2015

(86) PCT No.: PCT/EP2015/052185
§ 371 (c)(1),
(2) Date: Jul. 19, 2016

(87) PCT Pub. No.: WO2015/114161
PCT Pub. Date: Aug. 6, 2015

(65) Prior Publication Data
US 2016/0341189 A1    Nov. 24, 2016

(30) Foreign Application Priority Data

Feb. 3, 2014 (DE) .................. 10 2014 001 248

(51) Int. Cl.
*F04B 39/00* (2006.01)
*F16J 1/22* (2006.01)
*F16J 7/00* (2006.01)

(52) U.S. Cl.
CPC ............ *F04B 39/0022* (2013.01); *F16J 1/22* (2013.01); *F16J 7/00* (2013.01)

(58) Field of Classification Search
CPC ....................................... F16J 1/22; F16J 7/00
See application file for complete search history.

(56) References Cited

U.S. PATENT DOCUMENTS

| | | | | |
|---|---|---|---|---|
| 1,637,765 A | * | 8/1927 | Comstock | F16J 1/22 184/18 |
| 1,763,625 A | * | 6/1930 | Mellor | F02F 3/0015 123/41.38 |
| 2,317,004 A | * | 4/1943 | Wallgren | F01M 1/06 184/6.5 |

(Continued)

FOREIGN PATENT DOCUMENTS

DE    43 08 751 A1    9/1994
EP    0 459 546 A1    12/1991
(Continued)

OTHER PUBLICATIONS

PCT International Search Report for corresponding International Application No. PCT/EP2015/052185; dated May 21, 2015.

*Primary Examiner* — Thomas E Lazo
(74) *Attorney, Agent, or Firm* — Quarles & Brady LLP

(57) ABSTRACT

The present invention relates to a connecting rod comprising a small spherical end having a ball and a main rod. The ball and the main rod are designed as individual parts and form, when assembled, a connecting rod having a spherical small end.

20 Claims, 3 Drawing Sheets

(56) References Cited

U.S. PATENT DOCUMENTS

| | | | | |
|---|---|---|---|---|
| 2,451,216 A * | 10/1948 | Halfvarson | ................ | F16J 1/22 |
| | | | | 403/152 |
| 4,938,121 A * | 7/1990 | Melchior | .................. | F16J 1/22 |
| | | | | 92/110 |
| 5,146,883 A | 9/1992 | Reipert et al. | | |
| 5,305,684 A * | 4/1994 | Melchior | .................. | F16J 1/22 |
| | | | | 92/187 |
| 6,579,492 B2 * | 6/2003 | Wehler | ................... | B22F 5/003 |
| | | | | 419/28 |
| 7,100,494 B2 * | 9/2006 | Petersen | ................... | F16J 1/22 |
| | | | | 92/186 |
| 7,134,383 B2 * | 11/2006 | Petersen | ................... | F16J 1/22 |
| | | | | 92/186 |
| 7,836,592 B2 * | 11/2010 | Murakami | .............. | B21J 5/063 |
| | | | | 29/888.091 |
| 2005/0120876 A1 | 6/2005 | Petersen et al. | | |

FOREIGN PATENT DOCUMENTS

| | | | |
|---|---|---|---|
| FR | 2195311 A7 | 3/1974 | |
| JP | S58 68548 A | 4/1983 | |

* cited by examiner

CONNECTING ROD-PISTON ASSEMBLY COMPRISING A CONNECTING ROD HAVING A SPHERICAL SMALL END

This application represents the national stage entry of PCT International Application No. PCT/EP2015/052185 filed Feb. 3, 2015, which claims priority to German Patent Application No. 10 2014 001 248.4 filed Feb. 3, 2014, the disclosure of which are incorporated herein by reference in their entirety and for all purpose.

The present invention relates to a connecting rod-piston assembly comprising a connecting rod having a spherical small end, to a method for producing a connecting-rod piston assembly, and to the use of a connecting rod-piston assembly in a refrigerant compressor.

German patent DE 749 285 discloses an articulated mounting of a connecting-rod member, which is provided with a ball-like small end, on a one-part nonmetallic piston. The piston has an oval opening into which the connecting-rod member is inserted. The connecting-rod member has at its small end two hemispherical disks which are arranged crosswise and which are spaced apart from one another by a shaft. The connecting-rod small end is guided in the cavity of the piston body on a spherical surface provided bottom side thereof and pressed resiliently against the guide surfaces of the piston body under the action of springs.

A disadvantage with such a connecting rod-piston assembly comprising a connecting rod having a spherical small end is the complicated assembly of the connecting rod-piston assembly owing to the design of the piston, the shape of the connecting-rod member and the use of springs.

It is the object of the invention to make it possible to simplify and improve a connecting rod-piston assembly comprising a connecting rod having a spherical small end.

This object is achieved by a connecting rod having the features of claim 1, by a connecting rod-piston assembly having the features of claim 5 and a method having the features of claim 12. Advantageous embodiments and developments are indicated in the respective dependent claims. The respectively indicated features in the description, in the description of the figures and in the figures can be linked generally and also especially with other features to give developments. In particular, the indicated examples with their respective features are not to be interpreted as limiting. Rather, the examples indicated there can also be linked with other features from other examples or from the general description.

According to the invention, a connecting rod having a spherical small end comprising a ball and a connecting-rod member is provided, wherein the ball and the connecting-rod member are designed as individual parts and, when assembled, form a connecting rod having a spherical small end. Here, both the connecting-rod member and the spherical small end can be produced in a conventional method. Furthermore, the production of the connecting rod having a spherical small end can be simplified by separately producing the ball and the connecting-rod member. For example, the connecting rod having a spherical small end can either be delivered completely mounted to the further processor or be assembled at the production site of the further processor. As a result, the mounting process of the further processor can be optimally configured and designed to obtain optimal mounting processes and run times. Furthermore, it is possible in a simple manner to adapt the desired length of the connecting rod according to the desired product to be produced by the further processor, since, instead of the production of another connecting rod having a spherical small end, only the connecting-rod member in the desired length need be exchanged. As a result, storage space at the production site of the further processor can be saved, since only the ball and the connecting-rod members in the different lengths have to be kept in stock. Furthermore, it is possible in this way to create a flexible kit system which opens up a large number of combination possibilities in terms of spherical small end, connecting-rod member, piston, crankshaft bearing of the connecting rod, and bearing between the piston and spherical small end.

After assembly, the connecting-rod member and the ball can advantageously be demounted again in a nondestructible manner. In this way, the connecting-rod member and the ball can be produced from different materials and be recycled in a simple manner.

In a preferred embodiment of the connecting rod, the connecting-rod member and/or the ball are each produced by a powder-metallurgical process, in particular by sintering. In this way, the connecting rod can be produced in a cost-effective manner. The term sintering here refers to a manufacturing process in which first of all a green body is pressed and thus the starting materials, which are present for example in crystalline, granular or pulverulent form, are compacted. The green body is then heated with preferably none of or, more preferably at most one of, the starting materials being melted. As a result of the heat treatment, the materials bake together at the surface and acquire their mechanical strength. Furthermore, a powder-metallurgical process makes it possible to largely spare the further mechanical processing of the individual parts. For some applications, processing on the diameter of the connecting-rod eye may be necessary in order to be able to further limit the production tolerances, for example for a sliding fit.

In particular, the weight of the connecting rod having a spherical small end can be reduced by a powder-metallurgical process. The connecting-rod member can preferably consist of a metal, in particular of Fe, or an Fe—C, Fe—Cu—C or Fe—Cu—C—S alloy. A proportion of S or MnS in the material for the connecting-rod member may favor any mechanical processing. Furthermore, the ball can consist of a metal, in particular of an Cu—Sn alloy, an Fe—Cu alloy, an Fe—C alloy or an Fe—Cu—C alloy. In this way, the connecting-rod member and the ball can have the same properties as a metallic connecting-rod member having a spherical small end that has been produced with a different production procedure, for example by casting.

After assembly to form a connecting rod having a spherical small end, the ball and the connecting-rod member in the connecting rod are preferably secured against separation with the aid of a nonpositive connection, in particular using a snap ring, and/or with the aid of an integrally bonded connection, in particular by welding, brazing or adhesive bonding. In this way, a situation can be prevented in which, after assembly, the connecting-rod member and the ball separate again. In particular, a nonpositive connection allows a simple disassembly of the connecting rod into its constituent parts. As a result, recycling or repair can be simplified, for example.

In a preferred embodiment of the connecting rod, the connecting-rod member has, at its side facing the ball, a journal, in particular a T-journal, and the ball has an opening for receiving the journal. In this way, the connecting-rod member can be inserted into the ball and be secured against falling out by the journal being received in the opening. Furthermore, the opening in the ball can have a slot-like design, with the result that the connecting-rod member is secured against falling out by rotating the connecting-rod member after inserting it into the ball. The opening in the ball can preferably be formed in such a way that, after inserting the connecting-rod member into the ball, the journal is not visible at the outer surface of the ball. In particular, the connecting-rod member and the ball can be connected together using a bayonet fastening. The term bayonet fastening here refers to a quickly producible and releasable mechanical connection of two parts in their longitudinal axis. The parts are connected by being plugged into one another and rotated in opposite directions and also separated again by such rotation. Furthermore, it would also be possible for the journal to have a thread and the ball to have a mating thread in the opening, with the result that the connecting-rod member can be screwed into the ball. Consequently, a connecting rod having a spherical small end can be formed in a simple manner.

The invention further relates to a connecting rod-piston assembly comprising a piston and an above-described connecting rod having a spherical small end, wherein the connecting rod comprises a ball and the ball is inserted into the piston, wherein the connecting rod-piston assembly has a securing element, preferably a ring, which secures the ball against falling out of the piston. As a result, it is possible in a simple manner to make available a connecting rod-piston assembly which requires no additional securing measures for protecting the ball from falling out of the piston. Work steps when installing the connecting rod-piston assembly in a device provided can be avoided and thus the assembly of the connecting rod-piston assembly can be simplified. A split bearing shell can advantageously be achieved in this way. For example, a bearing support can be formed in part in the piston as a bearing half-shell and, as mating piece, a bearing half-shell can be formed in the securing element. Here, the securing element can have a round, oval or polygonal shape. In particular, the connecting rod-piston assembly can be delivered in completely mounted form to the further processor or be assembled in the production site of the further processor. Furthermore, the connecting rod-piston assembly can be delivered in a plurality of subassemblies, for example in two or more units, and be assembled during final assembly. Advantageously, the connecting rod-piston assembly can also be demounted nondestructively. As a result, repair or recycling can be simplified. Furthermore, connecting rods having different lengths can be used for the connecting rod-piston assembly. As a result, the connecting rod-piston assembly can be used for different applications, for example in order to allow different strokes of the pistons during compression in different engines or compressors or piston machines or in compressed-air compressors or hydraulic pistons. In this way, the degree of standardization can be simplified and the number of different components required can be reduced.

The securing element preferably covers the ball in the piston. It can be ensured in this way that the ball does not wedge in the securing element but is freely movable in the piston. Furthermore, a situation can thereby be prevented in which environmental influences, for example contamination or liquid, can act directly on the ball via the securing element.

In a preferred embodiment, the securing element is formed in one part or from at least two parts. In this way, the securing element can be simply integrated in the assembly process. For example, in the case of a one-part embodiment, the securing element can be pushed first of all onto the connecting-rod member before the connecting-rod member is connected to the ball. In the case of a securing element consisting of at least two parts, the securing element can also be applied subsequently, for example if the connecting rod having a spherical small end is delivered as a premounted part.

In order to secure the ball, the piston and the securing element are preferably connected to one another in an integrally bonded manner, in particular by welding, brazing or adhesive bonding, or positively, in particular by flanging. It can be ensured in this way that the securing element cannot release from the piston during operation. Furthermore, in the case of a positive connection, the securing element can be separated from the piston nondestructibly. As a result, the individual parts of the connecting rod-piston assembly can be easily repaired, exchanged and/or fed for recycling.

In a preferred embodiment, the piston and/or the securing element are each produced by a powder-metallurgical process, in particular by sintering. In this way, a connecting rod-piston assembly can be made available in a cost-effective manner. As has already been described above, a mechanical processing of the individual parts can be largely spared by a powder-metallurgical process. For example, the mechanical processing can be reduced to a grinding of the outer diameter on the piston in order to be able to optimize a play between the piston and cylinder bore for the application. Furthermore, in some applications, processing on the diameter of the connecting-rod eye may be expedient in order to further limit the production tolerances, for example when using a sliding fit.

The securing element can preferably consist of a metal, in particular of an Fe—Cu—C alloy, or of a spring steel. Furthermore, the piston can consist of a metal, in particular of an Fe—C—S alloy, an Fe—MnS, Fe—C—MnS, Fe—Cu—C—MnS or Fe—Cu—C—S alloy. In order to obtain as optimum as possible a sealing between piston and cylinder, tight fits may be necessary. Therefore, the pistons can be mostly finish-machined, for example by centerless cylindrical grinding. In this way, the securing element and the piston can have the same properties as a securing element and a piston which have been produced in another way, for example by casting.

In order to reduce the friction between the piston and the ball, lubrication, preferably an oil impregnation or a dry lubricant, is preferably present. The term lubrication here describes a reduction of friction and wear between two machine elements as friction partners which move relative to one another. This occurs by the use of a suitable lubricant and lubricating process in tribology. The use of lubrication thus makes it possible to reduce the friction and thus the wear in the connecting rod-piston assembly. As a result, the service life of the connecting rod-piston assembly can be lengthened. Furthermore, a dry lubricant can be used if lubrication with grease or oil is not possible, is undesired or inadmissible, for example at low and high temperatures, in a vacuum or in the case of radioactive radiation.

A further possibility of improving the frictional properties of the ball is to admix a dry lubricant with the base powder of the ball and to produce the ball therewith. In a preferred embodiment, the dry lubricant comprises graphite, wherein the proportion of the graphite in the base powder of the ball is preferably in an amount of 1 percent by weight to 50 percent by weight, particularly preferably in an amount of 1.5 percent by weight to 25 percent by weight, in particular in an amount of 2 percent by weight to 15 percent by weight. The use of a dry lubricant makes it possible to protect the ball and the inside of the piston from damage through solid contaminants. Furthermore, it can be ensured by the proportion of the graphite in the base powder of the ball that the friction and thus the wear in the connecting rod-piston assembly are reduced. As a result, the service life of the connecting rod-piston assembly can be lengthened.

Furthermore, the lubrication as dry lubricant can be applied before inserting the ball into the inside of the piston. This can occur in the form of a coating. In order to ensure the adhesion of the coating, the parts can be repeatedly impregnated with plastic to close the pores and then repeatedly blasted or phosphated or be finished by a suitable combination of these processes. A coating with a lubricating varnish or a friction-reducing coating can then occur. This can be applied mechanically, for example by spraying or immersion, or by electroplating. As a result, the friction and thus the wear in the connecting rod-piston assembly can be reduced, with the result that the service life of the connecting rod-piston assembly can be lengthened.

There is further proposed a method for producing a connecting rod-piston assembly having a piston, a ball and a connecting-rod member, which method comprises the following steps:

assembling the connecting-rod member with the ball to form a connecting rod having a spherical small end, putting together the ball and piston.

In this way, the assembly of a connecting rod-piston assembly can be simplified.

The connecting rod-piston assembly preferably further comprises a securing element and the method further comprises the following step:

securing the ball in the piston, preferably by means of the securing element.

It can thus be ensured that, after assembly, the ball cannot fall out of the piston.

In a preferred embodiment, after assembly to form a connecting rod having a spherical small end, the ball and the connecting-rod member are secured against separation with the aid of a nonpositive connection, in particular using a snap ring, or with the aid of an integrally bonded connection, in particular by welding, brazing or adhesive bonding, and/or the piston and the securing element are connected to one another in an integrally bonded manner, in particular by brazing, welding or adhesive bonding, or positively, in particular by flanging. It can thus be ensured that the connecting rod-piston assembly does not unintentionally separate into its individual parts.

The invention further relates to the use of an above-described connecting rod-piston assembly in a refrigerant compressor. For example, the refrigerant compressor can comprise one or more cylinders, preferably two cylinders, in each of which the connecting rod-piston assembly is inserted. The refrigerant compressor particularly preferably makes use of one cylinder. In particular, the refrigerant compressors can be used in cooling and freezing cabinets and in the field of air-conditioning. The use of the connecting rod-piston assembly makes it possible to increase the flexibility in that different axial spacings can be simply achieved by exchanging the connecting-rod member. Furthermore, mounting the connecting rod-piston assembly with the cylinder block and the crankshaft can be much simplified. Furthermore, premounting of the piston in the cylinder with the ball and of the connecting-rod member with the crankshaft can be made possible.

The invention will be explained below by way of example, and in detail with reference to the figures. However, these illustrated embodiments should not be interpreted as limiting for the scope and with respect to particulars of the invention. Rather, the features emerging from the figures are not limited to the respective individual embodiments. Rather, these features can be combined with respective other features indicated in the drawing and/or in the description, including the description of the figures, in each case to give developments which will not be illustrated in more detail.

Figure 1:
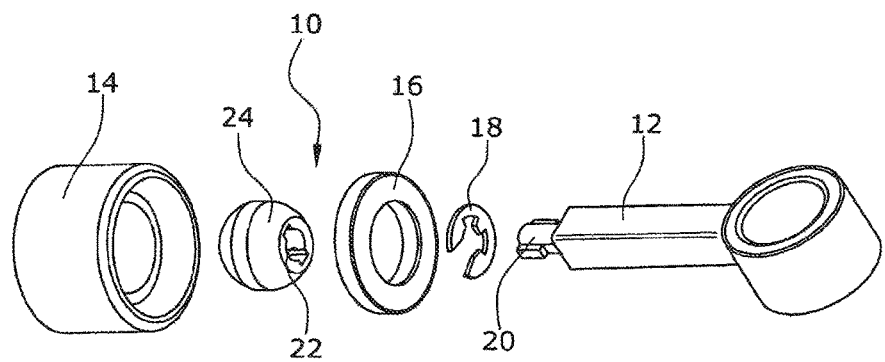
FIG. 1 shows an exploded drawing of a connecting rod-piston assembly.

FIG. 1 shows an isometric view of a connecting rod-piston assembly 10. The connecting rod-piston assembly 10 comprises a connecting-rod member 12, a ball 24, a piston 14, a securing element 16 in the form of a ring, and a snap ring 18. The connecting-rod member 12, the ball 24, the piston 14 and the securing element 16 can each be produced from a powder-metallurgical process, with the result that they can be produced cost-effectively and mechanical processing of the individual parts can largely be dispensed with. The connecting-rod member 12 has, at its side facing the ball 24, a journal 20 in the form of a T-journal. This journal 10 can be received in an opening 22 in the ball 24. A connecting rod having a spherical small end is formed by assembling the journal 20 with the opening 22. To secure the connecting-rod member 12 in the ball 24, after assembly, the snap ring 18 is fastened to the connecting-rod member 12. In order to form a connecting rod-piston assembly 10, the ball 24 is inserted into the piston 14. To reduce friction between the ball 24 and the piston 14, it is possible, for example, to use dry lubrication between the contacting surfaces of the ball 24 and the piston 14. The securing element 16 is used to secure the ball 24 in the piston 14. Here, the piston 14 and the securing element 16 can be designed in such a way that the piston 14 forms a bearing half-shell and the securing element 16 forms the mating piece of the bearing half-shell, with the result that the piston 14 and the securing element 16 together with the ball 24 form a bearing. The securing element 16 is illustrated in one part in FIG. 1, with the result that the securing element 16 must first be pushed onto the connecting-rod member 12 before the journal 20 of the connecting-rod member 12 is connected to the ball 24.

Figure 2A:
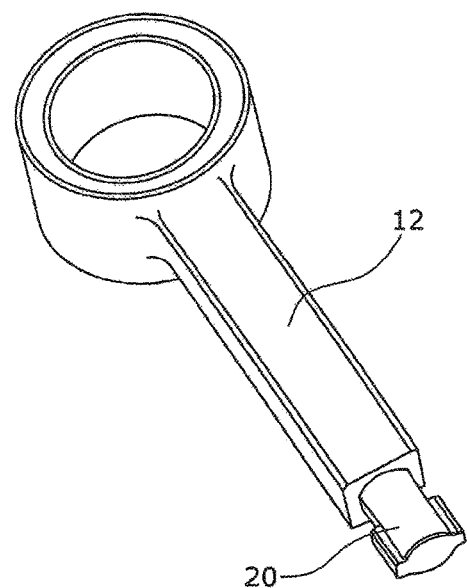
FIG. 2a shows an isometric view of a connecting-rod member.

FIG. 2a shows an isometric view of the connecting-rod member 12 having the journal 20. The journal 20 has a T-journal shape.

Figure 2B:
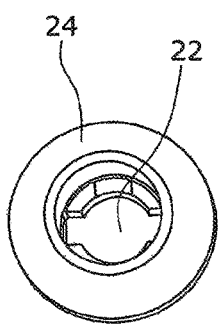
FIG. 2b shows an isometric view of a ball.

FIG. 2b shows an isometric view of the ball 24. It is illustrated in FIG. 2b that the opening 22 is enclosed by the outer wall of the ball 24. It is further illustrated that the opening 22 has a slot-like design, with the result that, after inserting the journal 20 and rotating the journal 20 by 90°, the journal 20 is secured in the ball 24 against falling out.

Figure 3:
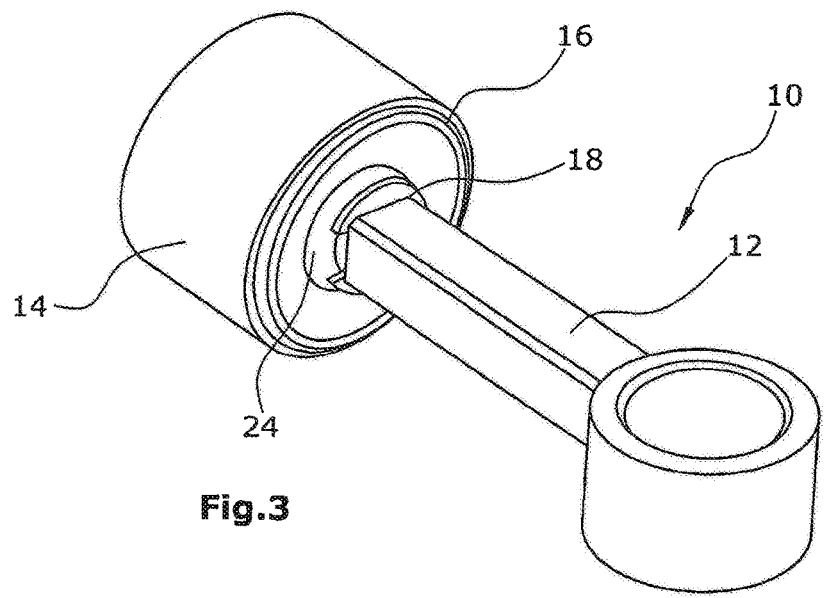
FIG. 3 shows an isometric view of a connecting rod-piston assembly.

FIG. 3 shows an assembled connecting rod-piston assembly 10. The connecting-rod member 12, the snap ring 18, the ball 24, the securing element 16 and the piston 14 are illustrated in FIG. 3. To prevent the securing element 16 separating from the piston 14, the edge of the piston 14 is flanged and in this way securely holds the inserted securing element 16. In this way, it is possible to disassemble the connecting rod-piston assembly 10 nondestructively in order to carry out a repair, for example.

Figure 4:
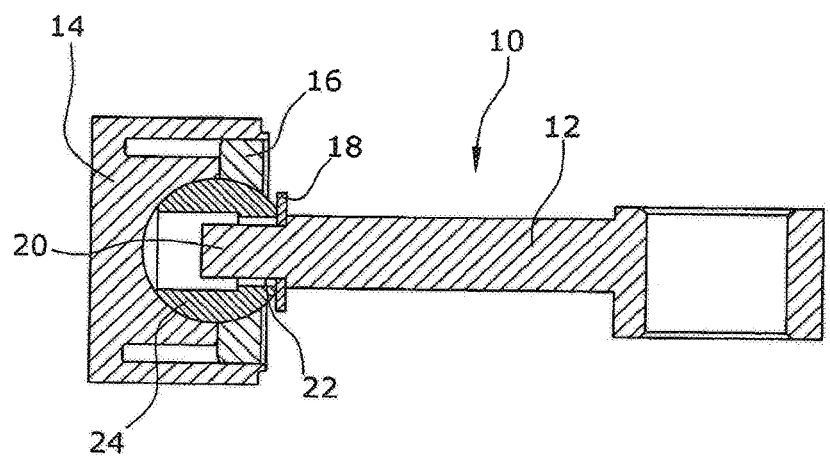
FIG. 4 shows a section of a side view of a connecting rod-piston assembly.

FIG. 4 shows a sectional view of a connecting rod-piston assembly 10. It is illustrated in FIG. 4 how the ball 24 is inserted into the piston 14. It is further illustrated that the securing element 16 secures the ball 24 in the piston 14 and that the edge of the piston 14 has been flanged in order to secure the securing element 16 against falling out. It is further illustrated that the journal 20 has been inserted into the opening 22 and has been rotated by 90°, with the result that the journal 20 cannot fall out of the opening 22.

Figure 5:
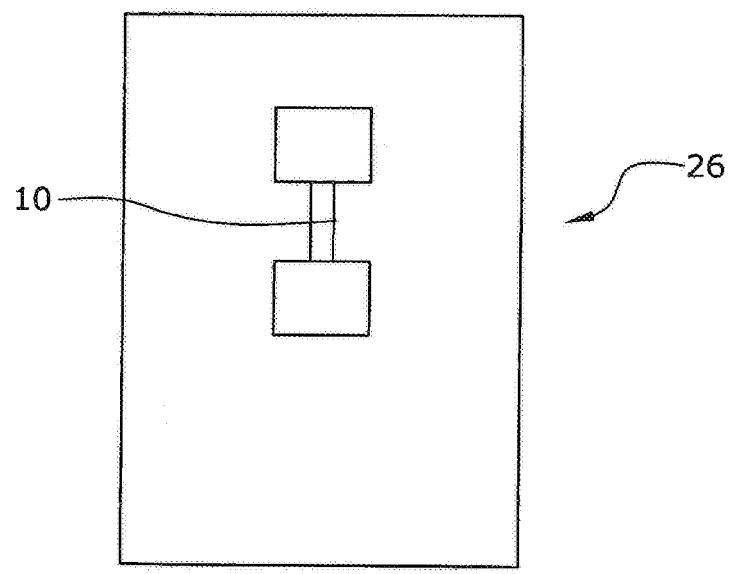
FIG. 5 shows a schematic drawing of a refrigerant compressor having a connecting rod-piston assembly.

FIG. 5 schematically illustrates a refrigerant compressor 26. The refrigerant compressor 26 uses a connecting rod-piston assembly 10.

The invention claimed is:

1. A connecting rod having a spherical small end comprising a ball and a connecting-rod member, wherein the ball and the connecting-rod member are designed as individual parts and, when assembled, form a connecting rod having a spherical small end and wherein the ball is a sintered powder metal part and the connecting-rod member is a sintered powder metal part.

2. The connecting rod as claimed in claim 1, wherein after assembly to form a connecting rod having a spherical small end, the ball and the connecting-rod member are secured against separation with the aid of a nonpositive connection and/or with the aid of an integrally bonded connection.

3. The connecting rod as claimed in claim 2, wherein the integrally bonded connection is one of welding, brazing, and adhesive bonding.

4. The connecting rod as claimed in claim 1, characterized in that the connecting-rod member has, at its side facing the ball, a journal and the ball has an opening for receiving the journal.

5. A connecting rod-piston assembly comprising a piston and a connecting rod having a spherical small end as claimed in claim 1, wherein the connecting rod comprises a ball and the ball is inserted into the piston, wherein the connecting rod-piston assembly has a securing element which secures the ball against falling out of the piston.

6. The connecting rod-piston assembly as claimed in claim 5, wherein the securing element covers the ball in the piston.

7. The connecting rod-piston assembly as claimed in claim 5, wherein the securing element is formed in one part or from at least two parts.

8. The connecting rod-piston assembly as claimed in claim 5, wherein in order to secure the ball, the piston and the securing element are connected to one another in an integrally bonded manner or positively.

9. The connecting rod-piston assembly as claimed in claim 5, wherein in order to reduce the friction between the piston and the ball, lubrication is present.

10. The connecting rod-piston assembly as claimed in claim 9, wherein the lubrication is an oil impregnation or a dry lubricant.

11. The use of a connecting rod-piston assembly as claimed in claim 5 in a refrigerant compressor.

12. The connecting rod as claimed in claim 1, wherein the ball being the sintered powder metal part provides a porosity in which lubricant is receivable.

13. A connecting rod-piston assembly comprising a piston and a connecting rod having a spherical small end comprising a ball and a connecting-rod member, wherein the ball and the connecting-rod member are designed as individual parts and, when assembled, form a connecting rod having a spherical small end, wherein the ball is a sintered powder metal part, wherein the connecting rod comprises a ball and the ball is inserted into the piston, wherein the connecting rod-piston assembly has a securing element which secures the ball against falling out of the piston, and wherein the piston and/or the securing element are each sintered powder metal parts.

14. A connecting rod-piston assembly comprising a piston and a connecting rod having a spherical small end comprising a ball and a connecting-rod member, wherein the ball and the connecting-rod member are designed as individual parts and, when assembled, form a connecting rod having a spherical small end, wherein the ball is a sintered powder metal part, wherein the connecting rod comprises a ball and the ball is inserted into the piston, wherein the connecting rod-piston assembly has a securing element which secures the ball against falling out of the piston, wherein in order to reduce the friction between the piston and the ball, lubrication is present, and wherein the lubrication is provided is a dry lubricant comprises graphite which is proportioned in a base powder of the ball.

15. A method for producing a connecting rod-piston assembly having a piston, a ball and a connecting-rod member, comprising the following steps:
assembling the connecting-rod member with the ball to form a connecting rod having a spherical small end wherein the ball is a sintered powder metal part,
putting together the ball and piston
wherein the step of assembling the connecting-rod member with the ball to form a connecting rod having a spherical small end includes connecting the connecting rod member and the ball using a bayonet fastening.

16. The method as claimed in claim 15, wherein the connecting rod-piston assembly further comprises a securing element and the method further comprises the following step:
securing the ball in the piston using the securing element.

17. The method for producing a connecting rod-piston assembly as claimed in claim 15, wherein after assembly to form a connecting rod having a spherical small end, the ball and the connecting-rod member are secured against separation with the aid of a nonpositive connection or with the aid of an integrally bonded connection and/or the piston and the securing element are connected to one another in an integrally bonded manner, or positively.

18. A connecting rod having a spherical small end comprising a ball and a connecting-rod member, wherein the ball and the connecting-rod member are designed as individual parts and, when assembled, form a connecting rod having a spherical small end and wherein the ball is a sintered powder metal part, wherein after assembly to form a connecting rod having a spherical small end, the ball and the connecting-rod member are secured against separation with the aid of a nonpositive connection and/or with the aid of an integrally bonded connection, and wherein the non-positive connection uses a snap ring.

19. A connecting rod-piston assembly comprising a piston and a connecting rod having a spherical small end comprising a ball and a connecting-rod member, wherein the ball and the connecting-rod member are designed as individual parts and, when assembled, form a connecting rod having a spherical small end, wherein the ball is a sintered powder metal part, wherein the connecting rod comprises a ball and the ball is inserted into the piston, wherein the connecting rod-piston assembly has a securing element which secures the ball against falling out of the piston, and wherein the securing element is a ring.

20. A connecting rod having a spherical small end comprising a ball and a connecting-rod member, wherein the ball and the connecting-rod member are designed as individual parts and, when assembled, form a connecting rod having a spherical small end, wherein the ball is a sintered powder metal part, and wherein the connecting rod member and the ball are connected together using a bayonet fastening.

* * * * *

UNITED STATES PATENT AND TRADEMARK OFFICE
CERTIFICATE OF CORRECTION

| | |
|---|---|
| PATENT NO. | : 10,294,931 B2 |
| APPLICATION NO. | : 15/112604 |
| DATED | : May 21, 2019 |
| INVENTOR(S) | : Antonio Casellas et al. |

It is certified that error appears in the above-identified patent and that said Letters Patent is hereby corrected as shown below:

In the Specification

Column 1, Line 9, "disclosure" should be --disclosures--.

Column 1, Line 10, "purpose" should be --purposes--.

Signed and Sealed this
Thirtieth Day of July, 2019

Andrei Iancu
*Director of the United States Patent and Trademark Office*